United States Patent [19]
Stanley

[11] 3,986,732

[45] Oct. 19, 1976

[54] DUAL CONCENTRIC VAPOR RECOVERY FUEL HOSE AND END FITTING THEREFOR

[75] Inventor: John H. Stanley, Libertyville, Ill.

[73] Assignee: The Goodyear Tire & Rubber Company, Akron, Ohio

[22] Filed: Mar. 24, 1975

[21] Appl. No.: 561,448

[52] U.S. Cl. ............... 285/134; 285/174; 285/190; 285/256; 285/281
[51] Int. Cl.² .......................... F16L 39/04
[58] Field of Search ......... 285/134, 138, 190, 281, 285/174, 133 R, 276, 256

[56] References Cited
UNITED STATES PATENTS

| 236,519 | 1/1881 | Walsh | 285/134 |
|---|---|---|---|
| 3,442,539 | 5/1969 | Randall | 285/190 |
| 3,684,316 | 8/1972 | Lavender | 285/134 |
| 3,841,671 | 10/1974 | Walker | 285/174 X |

Primary Examiner—Dave W. Arola
Attorney, Agent, or Firm—F. W. Brunner; L. A. Germain

[57] ABSTRACT

Dual concentric fuel and vapor recovery hoses are disclosed wherein an inner substantially kink-proof reinforced pressure hose carries fuel while an outer larger diameter extruded cover hose provides a vapor recovery path between the two hoses. The dual concentric hoses terminate into an end fitting that provides for separate rotatability of the hoses while also providing direct fuel feed through the fitting and a parallel vapor recovery path.

11 Claims, 3 Drawing Figures

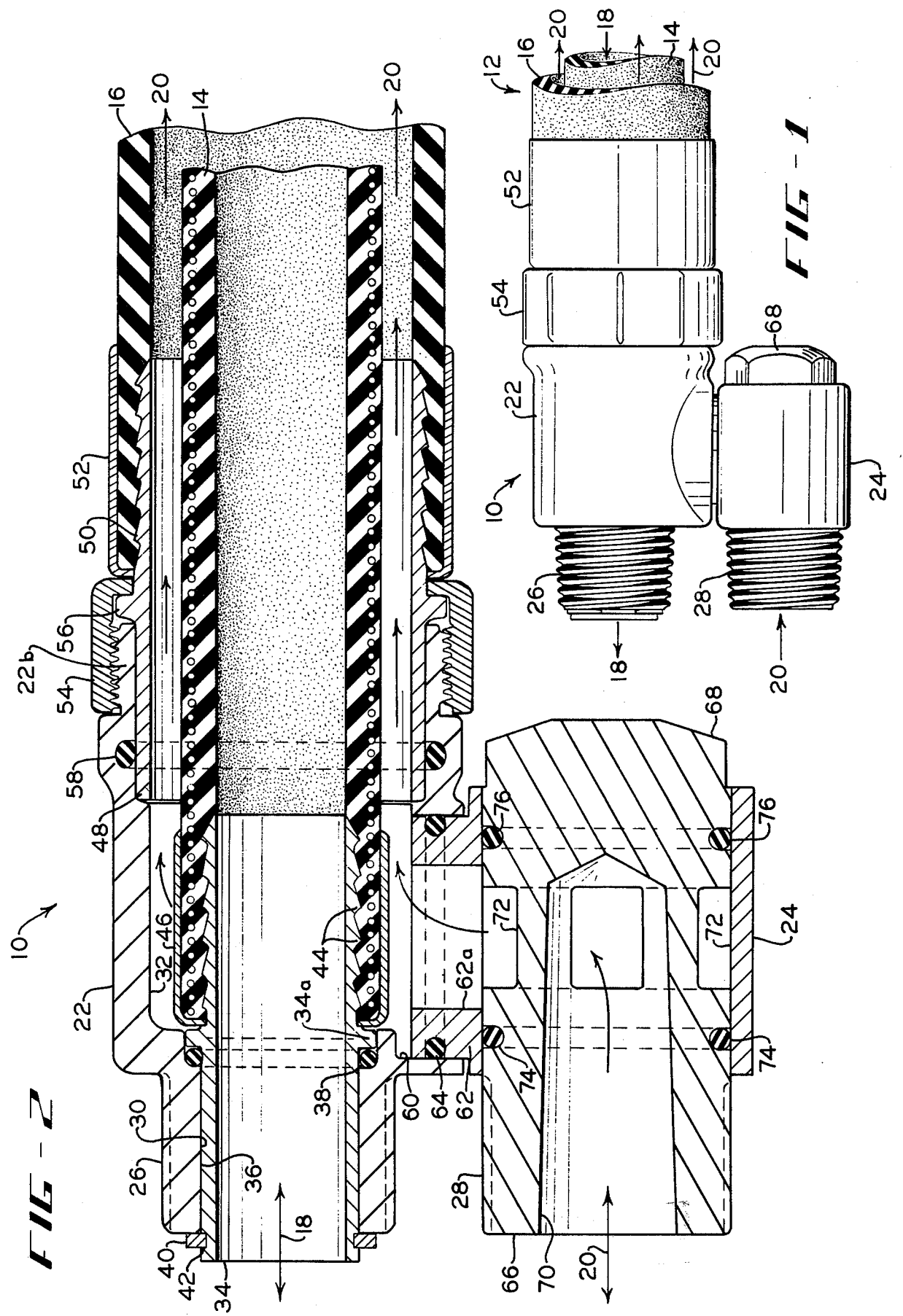

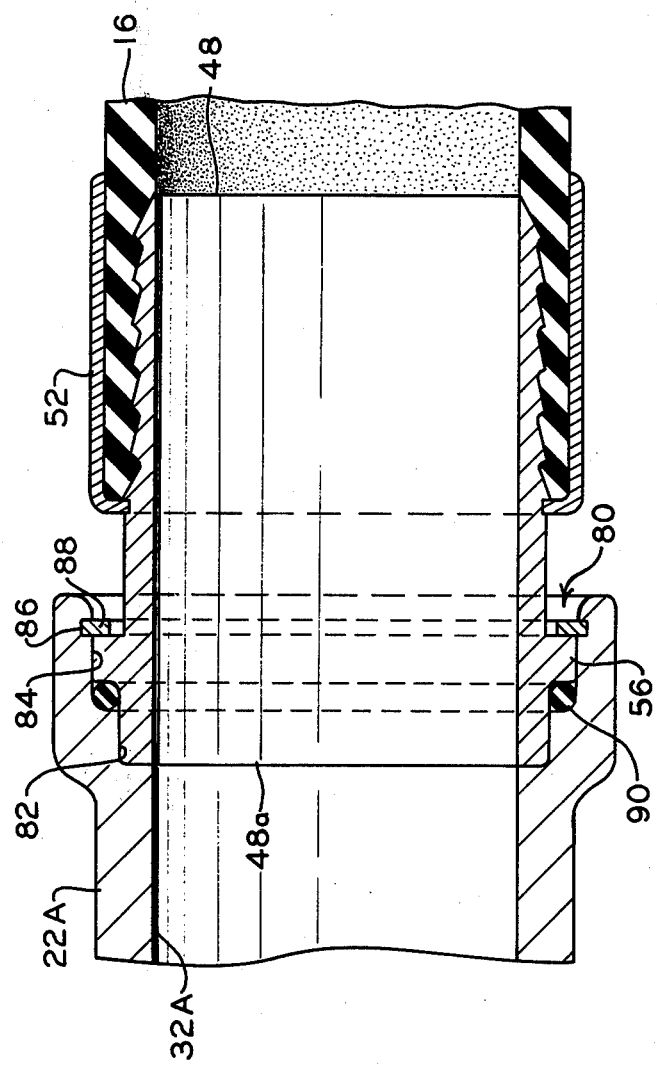

ated vehicles, fuel loss in the form of vapor may be measured in the thousands of tons per year and this waste, as well as the obvious hazard and polluting effect, is being countered by various types of vapor recovery systems. These systems generally include a pair of hoses, one carrying fuel to the vehicle while being pumped from the supply, the other carrying fuel vapor from the vehicle tank being filled. Presently used dual hose systems carry parallel hoses that connect, via mounted end fittings, into mating ports on the pump and nozzle. These parallel hoses are made fairly large to permit gravity return of fuel vapors and consequently are heavy, difficult to maneuver without kinking, and do not drape well on the pump stand.

DUAL CONCENTRIC VAPOR RECOVERY FUEL HOSE AND END FITTING THEREFOR

BACKGROUND OF THE INVENTION

This invention generally relates to curb pump hoses and more particularly to a dual concentric vapor recovery fuel hose and end fitting that is attachable to dual parallel hose pump and nozzle assemblies.

In the activity of refueling vehicles, fuel loss in the form of vapor may be measured in the thousands of tons per year and this waste, as well as the obvious hazard and polluting effect, is being countered by various types of vapor recovery systems. These systems generally include a pair of hoses, one carrying fuel to the vehicle while being pumped from the supply, the other carrying fuel vapor from the vehicle tank being filled. Presently used dual hose systems carry parallel hoses that connect, via mounted end fittings, into mating ports on the pump and nozzle. These parallel hoses are made fairly large to permit gravity return of fuel vapors and consequently are heavy, difficult to maneuver without kinking, and do not drape well on the pump stand.

It is therefore an object of this invention to provide an improved vapor recovery dual hose configuration that is more flexible in handling, eliminates excess weight and bulk of parallel hose systems, is economical to produce, and is readily adapted to parallel hose and nozzle systems by reason of its unique end fitting.

Another object of the invention is to provide an end fitting for dual concentric hoses that is easily dismantled reusable, and facilitates replacement of either or both hoses.

In this respect the invention provides a vapor recovery hose and end fitting assembly comprising a reinforced, substantially non-compressible pressure hose; an extruded rubber cover hose of larger diameter than the pressure hose; and an end fitting connecting both pressure and cover hoses in concentric relationship to each other; said end fitting comprising: a primary body member having an exit port and an inner chamber; means coupling the pressure hose to the exit port; means coupling the cover hose to the inner chamber; and a secondary body member having an exit port and an inner chamber, said secondary body member coupled to said primary body member such that the inner chambers are interconnected, said exit port of the primary body member providing a path for fuel delivery while said exit port of the secondary body member provides a vapor return path between the concentric pressure and cover hoses.

DESCRIPTION OF THE DRAWINGS

The objects of advantages of the invention will become more apparent from the following detailed description and claims, particularly when considered in conjunction with the accompanying drawings in which like parts bear like reference numerals.

FIG. 1 is an elevational view of the dual concentric vapor recovery hose and end fitting assembly in accordance with the present invention;

FIG. 2 is an enlarged elevational view, in section, of the assembly of FIG. 1 showing the details of the assembly; and FIG. 3 is an enlarged elevational view, in section and partially broken away, of an alternate embodiment of the end fitting forming a part of this invention.

DESCRIPTION OF THE INVENTION

With reference to the drawings, a hose end fitting 10 is shown accepting a pair of concentrically oriented hoses 12. The inner hose 14 of the pair is a substantially incompressible reinforced pressure hose as may be used for pumping vehicle fuels. Various constructions are known in the art and may include wire wound reinforcement to maintain the non-kinking integrity of the hose in the pumping of fuels. While the inner hose is substantially incompressible, the outer hose 16 is an extruded rubber cover compounded for abrasion resistance and wear and has an inside diameter greater than the outside diameter of the inner hose. Assuming that the drawing illustrates the hose fitting at the nozzle end of a fuel dispensing system, arrow 18 indicates the direction of fuel flow into the nozzle while arrows 20 indicate the direction of fuel vapor return. As is clearly evident, vapor recovery is accomplished using the annular volume that exists between the inner and outer hoses.

The hose end fitting 10 is designed to couple into prior art nozzles or pump stands having parallel ports wherein dual parallel hoses are attached for communicating fuel and vapor. In this respect, a primary body member 22 is provided to accept concentric hoses 12 while a secondary body member 24 is provided for passage of fuel vapor. As shown in FIG. 1, fuel line attachment is made via threaded nipple 26 while vapor line attachment is made via threaded nipple 28. Obviously, when the end fitting is attached to the pump stand end of the hose assembly, arrows 18 and 20 will be reversed in direction. FIG. 2 more clearly illustrates the working elements of hose fitting 10. In particular the fitting comprises a primary body member 22 and an interconnected secondary body member 24. The primary body 22 is characterized by a threaded nipple 26 defining an exit port 30 that terminates on the inside of the body 22 in a larger diameter chamber 32. A hose retaining cylindrical stem 34 is mounted for rotation within the port 30 and the interface 36 is sealed by reason of an O-ring 38. To limit the inward travel of the stem, a contracting type snap ring 40 is mounted in a recess 42 on the protruding end of the stem 34. At the opposite end of the stem 34 the reinforced fuel hose 14 is secured to the stem by gripping ribs 44 and a ferrule 46 in a manner well known in the art. Of course the outward travel of the stem 34 is limited by a shoulder or flange 34a located midway on the stem and abuts the O-ring 38 to effect the seal. Thus the stem 34 is fixed within the primary body 22 but capable of rotational movement therein while communicating fuel in a direct path thru the fitting.

In a similar manner, the primary body 22 receives a second hose retaining cylindrical stem 48 that is secured to the larger diameter cover hose 16 by reason of gripping ribs 50 and ferrule 52. The hose stem 48 is slidably received within the primary body 22 and held in position by a threaded collar 54 acting on a stem flange or shoulder 56. Sealing of the stem within the primary body is accomplished by an O-ring 58. As clearly illustrated in the drawing, the diameter of the chamber 32, the inside diameter of the stem 48, and the inside diameter of the hose 16 are substantially the same dimension.

In order to communicate fuel vapor to the chamber 32 and thus to the vapor path provided between the hoses 14 and 16, the secondary body member 24 is fit into a connecting port 60 via a nipple end 62 defining a passage 62a into the chamber 32. Secondary body 24 thus rotates on an axis transversely to the axis of the primary body 22. A seal is effected between the secondary body and the port 60 by an elastomeric O-ring 64. In this manner the relative depth and spacing of the two threaded ports 26 and 28 are self-adjusting to the parallel ports of the nozzle or pump stand assembly.

Slidably received within the secondary body member and in parallel relationship with the primary body 22 is an insert of hollow stud 66 that has a threaded open end 28 and terminates in a hexagonal nut 68 at the opposite end thereof. The stud 66 defines a chamber 70 that provides a passage to an annular recess 72 cut into the outer surface of the stud. The recess 72 cooperates with the passage 62a in such a manner that fuel vapors entering the chamber 70 may be communicated to the vapor recovery path between the hoses 14 and 16. To seal the stud 66 within the secondary body member, a pair of elastomeric O-rings 74 and 76 are located at either side of the recess 72.

An alternate embodiment of the primary body member 22 is illustrated in FIG. 3. For simplicity, the inner hose connection is not included in the drawing as no change is made to that portion shown in FIG. 2. In FIG. 3, the primary body 22 is greatly simplified by eliminating the threaded end portion 22b and the hose stem 48 is simplified by eliminating threaded collar 54. Instead, body member 22A comprises a stepped bore 80 having inner increased diameter portions 82 and 84. At the entrance end of portion 84 an annular slot or groove 86 is provided for receiving an expanding type snap-ring 88. In this embodiment hose stem 48 may be shortened and is retrained within the body member 22A by reason of the snap-ring acting on the stem flange or shoulder 56. To seal the connection an O-ring 90 is mounted on the stem 48 at its nipple end 48a.

While certain representative embodiments and details have been shown for the purpose of illustrating the invention, it will be apparent to those skilled in this art that various changes and modifications may be made therein without departing from the spirit or scope of the invention.

What is claimed is:

1. A dual concentric hose and endfitting assembly for delivering fuel and recovering fuel vapor comprising:
    A. an outer substantially flexible cover hose;
    B. an inner substantially incompressible pressure hose, the O.D. of the inner hose being less than the I.D. of the outer hose such that an annular passage exists between the two hoses;
    C. an end-fitting comprising a primary body defining a hose receiving chamber and axial and orthogonal nipples having ports communicating with the chamber and,
    a secondary body slidably and rotatably coupled into the orthogonal nipple port of the primary body, said secondary body defining a vapor passage into the primary body chamber and having a nipple port communicating with said passage that is in parallel alignment to the axial port of the primary body;
    D. means preventing removal of and swivel coupling the inner hose into the axial port of the primary body such that a direct delivery fuel path is provided through the end fitting; and
    E. means preventing removal of and swivel coupling the outer hose into the primary body chamber such that the annular passage between the hoses and the secondary body vapor passage are coupled via the primary body chamber to provide the vapor recovery path through the assembly.

2. The assembly as set forth in claim 1 wherein the means preventing removal of and swivel coupling the inner hose into the axial port comprises a cylindrical stem having outwardly protruding ribs on one end portion thereof for engaging the inner surface of the hose and a ferrule mounted to compressibly hold the hose on the ribbed end of the stem, the opposite end of the stem rotatably received in the axial port and having an annular outward facing groove at the end of the stem that protrudes past the confines of the port such that a contracting type snap-ring mounted in the groove limits the axial inward travel of the stem while a shoulder at the ferrule end of the stem limits the axial outward travel of the stem.

3. The assembly as set forth in claim 2 wherein an elastomeric O-ring is mounted to provide a seal between the axial port and the inner hose stem.

4. The assembly as set forth in claim 1 wherein the means preventing removal of and swivel coupling the outer hose into the primary body chamber comprises an expanding type snap-ring mounted in an annular groove within the chamber and a cylindrical stem having one end portion inserted in the hose with a ferrule mounted on the stem to compressibly hold the hose on the stem, said stem having a flange on its opposite end that is in abutting relationship with said snap-ring to retain the stem in the chamber.

5. The assembly as set forth in claim 4 wherein an elastomeric O-ring is mounted to provide a seal between the stem and chamber.

6. The assembly as set forth in claim 1 wherein the primary body has outward facing threads at the entrance to the hose receiving chamber and the means preventing removal of and swivelly coupling the outer hose into the chamber comprises a cylindrical stem having a ribbed body portion and a ferrule at one end for mounting the hose to the stem while at the opposite end an outward facing flange on the stem retains a threaded collar for engagement with the threads on the primary body to lock the hose stem into the chamber.

7. The assembly as set forth in claim 6 wherein an elastomeric O-ring seals the stem and chamber interface..

8. A dual concentric hose and end-fitting assembly for delivering fuel and recovering fuel vapor comprising:
    A. a flexible outer hose having one end portion of a cylindrical stem mounted in its bore and a ferrule mounted on the stem compressibly holding the hose to the stem, the opposite end portion of said stem having an annular outward facing flange formed therearound;
    B. a substantially incompressible inner pressure hose in concentric relation to the outer hose having an outside diameter less than the inside diameter of the outer hose bore such that an annular passage exists between the two hoses, said pressure hose having the ribbed end portion of a cylindrical stem mounted in its bore and a ferrule mounted on the stem compressibly holding the hose to the stem, the opposite end portion of the stem having an annular outward facing groove formed therearound for receiving a contracting type snap-ring therein;
    C. an end-fitting coupled to the concentric hoses to provide a direct fuel path to the pressure hose and a vapor path to the annular passage between the hoses comprising:

a. a primary body defining a cylindrical chamber and first and second nipple ends, the first nipple defining a coaxial access port into the chamber and the second nipple defining an orthogonal access port into the chamber, said chamber having an open hose-receiving end and an annular inward facing groove at the entrance to the chamber, said chamber terminating into the axial port at the opposite end thereof; said pressure hose connected through the hose-receiving end of the chamber and into the axial port by its stem being slidably and rotatably received in and extending through the nipple port such that a contracting type snap-ring fitted in the annular groove limits the axial inward excursion of the stem within the port, said outer hose connected into the chamber by its stem being received in the hose receiving end of the chamber and retained in the chamber by an expanding type snap-ring fitted in the annular inward facing chamber groove such that said ring is in abutting relationship with the annular flange of the outer hose stem; and b. a secondary body defining an axial bore and an orthogonal nipple having an access port into the bore, said nipple coupled into the orthogonal port of the primary body to rotate about the orthogonal axis; said secondary body having a cylindrical stud rotatably received within the bore, said stud having an axial bore penetrating the substantial length of the stud and an annular outward facing groove communicating with the bore and the orthogonal port of the secondary body such that a vapor passage is provided through the body and into the primary body chamber.

9. The assembly as set forth in claim 1 wherein the outer hose is an extruded rubber cover and the inner hose is a wire reinforced pressure hose.

10. The assembly as set forth in claim 2 wherin the inner hose stem carries on O-ring to seal the stem in the axial port and the outer hose stem carries an O-ring to seal the stem in the chamber.

11. The assembly as set forth in claim 1 wherein the secondary body is slidably and rotatably received in the orthogonal nipple port of the primary body such that the relative distance between the stud bore axis and the axial port on the primary body is adjustable.

* * * * *